United States Patent [19]

Masaki et al.

[11] Patent Number: 4,609,841

[45] Date of Patent: Sep. 2, 1986

[54] THREE-ROTARY POSITION CONTROL DEVICE

[75] Inventors: Kazuo Masaki, Chiryu; Motoji Suzuki, Okazaki; Noriyuki Nakashima, Nagoya, all of Japan

[73] Assignee: Nippondenso Co., Ltd., Kariya, Japan

[21] Appl. No.: 724,334

[22] Filed: Apr. 17, 1985

[30] Foreign Application Priority Data

Apr. 25, 1984 [JP] Japan ................................ 59-84928

[51] Int. Cl.⁴ ............................................... H02K 7/10
[52] U.S. Cl. ..................................... 310/75 R; 310/83
[58] Field of Search ................ 310/75 R, 84, 83, 95 R, 310/77, 78

[56] References Cited

U.S. PATENT DOCUMENTS

| | | | |
|---|---|---|---|
| 2,879,416 | 3/1959 | Blauz | 310/77 |
| 3,068,975 | 12/1962 | Theuer | 310/77 X |
| 3,422,700 | 1/1969 | Wittwer | 310/75 R X |
| 3,478,238 | 11/1969 | Herman et al. | 310/77 |
| 3,783,312 | 1/1974 | Schidel et al. | 310/77 X |
| 4,313,529 | 2/1982 | Kato et al. | |

Primary Examiner—Donovan F. Duggan
Attorney, Agent, or Firm—Cushman, Darby & Cushman

[57] ABSTRACT

A rotary position control device is provided with a three-rotary position controlling mechanism. The control device includes a disk member having a toothed portion on its circumferential part, to which an output shaft is secured in order to drive a driven source coupled to the output shaft. The disk member further has a circumferentially spaced slot having a recessed portion provided halfway between the both ends, the both ends and the recessed portion functioning as first, second and third stopper portions which receive a rod member disposed in the slot. The disk member stops its rotation when the rod member engages the both ends of the slot of the disk and also when the rod member engages the recessed portion, this third stop position of the disk member being achieved only when the electromagnetic solenoid is energized, thus causing the required relative movement between the output shaft and the driven source coupled to the output shaft. A motor as a motive source is housed in the control device to rotate the disk, which is supplied a driving signal from the exterior of the rotary position control device.

7 Claims, 8 Drawing Figures

FIG. 3
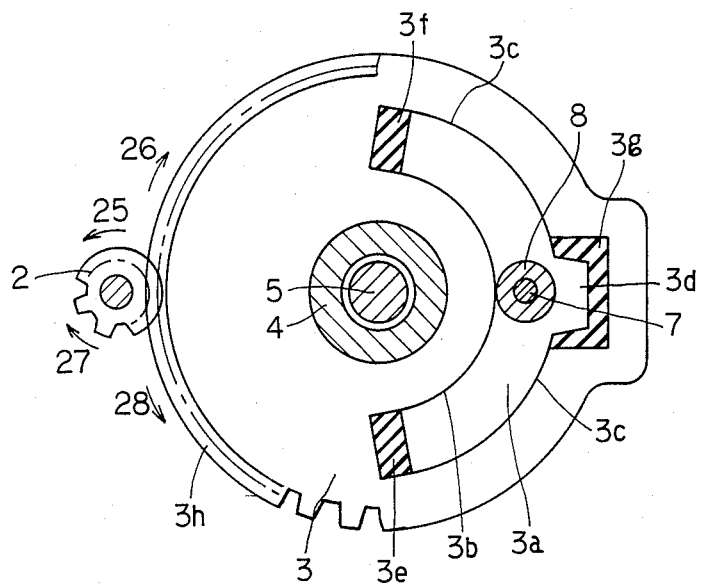
FIG. 4(a)  FIG. 4(b)  FIG. 4(c)
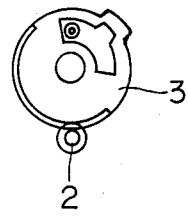 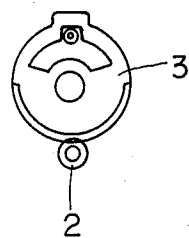 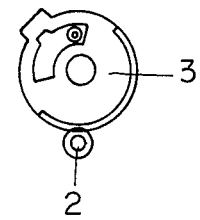

THREE-ROTARY POSITION CONTROL DEVICE

FIELD OF THE INVENTION

The present invention relates to a rotary device provided with a three-rotary position control mechanism, more specifically, to a rotary device having a motor and an output shaft coupled to a driven source, which has three rotary positions at which the output shaft is controlled to stop. The device may be used for controlling damping force step by step of a shock absorber mounted on the front and rear suspensions of a vehicle in accordance with the driving condition of the vehicle.

DESCRIPTION OF THE PRIOR ART

A three-rotary position control device may be used for a three-way electromagnetic valve. The U.S. Pat. No. 4,313,529 has disclosed such rotary actuator used for a shock absorber, with a d.c. motor or a pulse motor. A rotary actuator using a d.c. motor has an advantage, as compared with that using a pulse motor, that the construction of the motor is simplified and a pulse motor driving circuit is not additionally needed, however, in turn has a deficiency such that a rotary position detecting sensor for detecting a rotational position of the d.c. motor so as to feedback the corresponding signal to a driving circuit is needed.

SUMMARY OF THE INVENTION

It is, therefore, an object of the present invention to provide a simple three-rotary position control device which allows a precise rotary position control of an output shaft of the device without using a rotational position detecting sensor.

Another object of the present invention is to provide a three-rotary position control device wherein a direction of current flowing through a d.c. motor and a power-supply to an electromagnetic solenoid are controlled so that the output shaft of the control device has excellent and fast rotary response.

Further object of the present invention is to provide a simple and easily manufactured and assembled three-rotary position control device comprising a disk member with a toothed portion having first to third limit stops which determine first to third rotary positions of the output shaft of the device.

Still another object of the present invention is to provide a durable and low sound of running control device wherein a rod member engages each limit stop provided on a disk member by the rotation of the disk member with a minimum impact force thereon.

In order to accomplish the afore-going objects, a three-rotary position control device, according to the present invention, comprises a pinion 2 rotated by a motor 1, which in turn causes the required rotation of a gear 3 in the opposite direction. An output shaft 5 is secured to the gear 3 and is driven so that it is controlled to stop at either one of three rotary positions by the relative movement as the gear 3 rotates.

The gear 3 has a circumferentially spaced arcuate slot 3a, both ends of which function as first and second stopper portions 3f and 3e away at a predetermined degree angle. A rod member 7 secured to a fixed member is disposed between the first and second stopper portions 3f and 3e. When the gear 3 is rotated in the counter-clockwise or clockwise direction the rod member 7 engages either one of the first and second stopper portions 3f and 3e so that further rotation of the gear 3 is prevented. The rod member 7 is coupled to an electromagnetic solenoid S provided on same side as the fixed member is provided so that it is, for instance, moved in the perpendicular direction to its axis when the electromagnetic solenoid S is energized.

Between the first and second stopper portions 3f and 3e of the gear 3, a third stopper portion 3g is provided and arranged so that when guided along with the inside wall 3b or 3c it is trapped halfway between the first and second stopper portions 3f and 3e by the third stopper portion 3g if the electromagnetic solenoid S is energized at that time, thus limiting further rotation of the gear 3 by the rod member 7.

The above and other objects, features and advantages of the present invention will become more apparent from the following description when taken in conjunction with the accompanying drawings well illustrating preferred embodiments of the present invention.

BRIEF DESCRIPTION OF THE DRAWINGS

FIG. 3 is a cross-sectional view of a portion of FIG. 1 showing relationship between a gear, a pinion and a rod;

FIGS. 4(a), 4(b) and 4(c) are cross-sectional views similar to FIG. 3 but illustrating three different stop positions of the gear;

DESCRIPTION OF A PREFERRED EMBODIMENT

Figure 1:
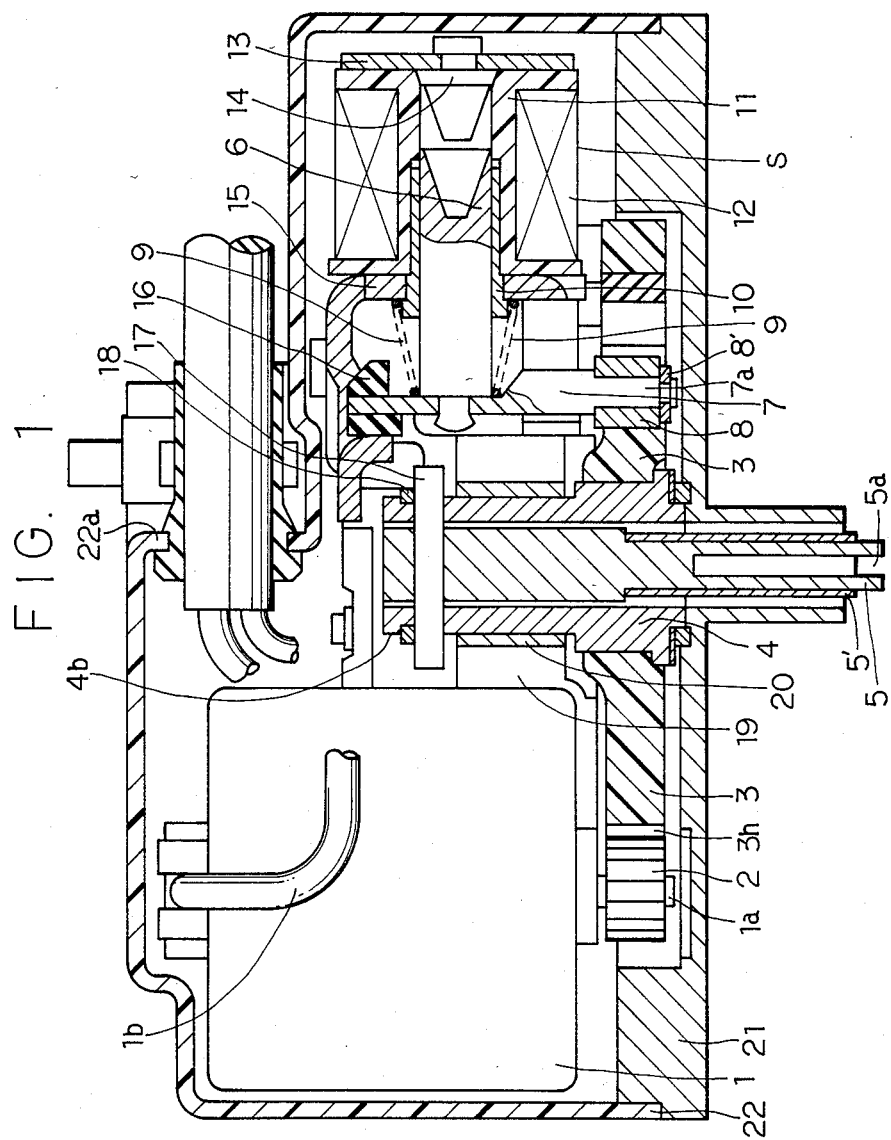
FIG. 1 shows a view in partial cross-section of an embodiment of a three-rotary position control device according to the present invention.

Referring now to FIG. 1, numeral 1 designates a motor, to a rotary shaft 1(a) of which a pinion 2 is fixed. The motor 1 has an electric wire, the opposite side of the rotary shaft side in the embodiment, through which the motor 1 is energized by a motor driving circuit not shown in FIG. 1. The motor 1 is mounted on a base 19 by means of not illustrated bolts and nuts.

The motor 1 is a d.c. motor consisting of a commutator, a brush, a permanent magnet and an armature. A cast metal gear 3 which meshes the pinion 2 at its toothed portion 3h on the circumferential part as a hole, and a first hollow shaft 4 installed into the hole at center of the gear 3 is rotatably disposed in a bearing 20 press-fitted into the base 19.

Figure 2:
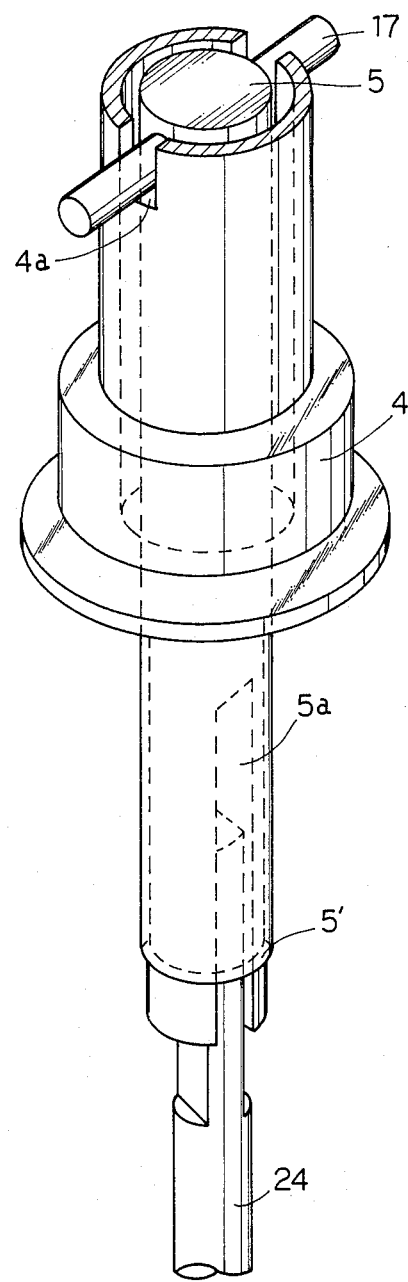
FIG. 2 shows a perspective view of an output shaft portion of the device of FIG. 1.

A second shaft 5 at one end having a cut portion 5a is inserted into the hollow portion of the first shaft 4 and is linked therebetween by a pin 17 press-fitted into the second shaft 5 at the other end as shown in FIG. 2 so that rotation motion is transmitted from the first shaft 4 to the second shaft 5 being an output shaft of a device of the present invention. In this case, the first and second shaft 4 and 5 both have sizes so that adequate clearance between them is provided, and another clearance is allowed between a cut-portion 4a of the first shaft 4 and the pin 17.

The cut portion 5a is perpendicular to the axis of the pin 17, to which a shaft 24 of a driven source such as a rotary valve is coupled. A sleeve 5' has a larger inside diameter than the diameter of the rotary valve shaft 24 and this allows clearance therebetween, thus permitting the movement of the second shaft 5 in accordance with the amount of the clearance. As described above, the first shaft 4, the second shaft 5, the pin 17 and the sleeve 5' forming the output shaft portion of the device are linked with each other in the linkage mechanism. When the second shaft 5 has been installed, a crimp member 18 is inserted at the cut portions 4a to prevent the second shaft 5 from working out of the first shaft 4. Provided, however, that the crip member 18 is not shown in order to illustrate relationship between the first and second shafts 4 and 5 and the pin 17 for clarity in FIG. 2.

The gear 3 has a circumferentially spaced arcuate slot 3a on side opposite to that where the toothed portion 3h is provided as shown in FIG. 3 and impact force absorbing members 3e to 3g which function as first, second and third stoppers are fitted into the both ends of and halfway position of the arcuate slot 3a, therefore, a roller 8 engages each of these impact force absorbing members 3e to 3g when the gear 3 is rotated. A housing base 21 and the base 19 are formed in one body and an electromagnetic solenoid S is mounted on side of the housing base 21 opposite to that on which the motor 1 is mounted.

The electromagnetic solenoid S comprises a plate 15 secured to the base 19 with revets, a sleeve 10 press-fitted into the center portion of the plate 15 and functioning as a shaft holder of a plunger 6 and magnetic circuit element, a spool 11 fixed to the plate 15 with a yoke 13 by locating from the outer periphery of the sleeve 10, a coil 12 and a stator core 14 fixed to the yoke 13, to which the plunger 6 is attracted when energized. A rod member 7 is secured to one end of the plunger 6, the left end in the embodiment of FIG. 1. On top of the rod 7 a rubber member 16 projecting in the axial direction of the plunger 6 is provided, and the lower portion of the rod 7 forms a shaft portion 7a rotatably disposed in the roller 8. A crip 8' is provided to retain the roller 8. The roller 8 seems to move in the circumferentially spaced arcuate slot 3a by the rotation of the gear 3 and selectively engages the absorbing members 3e, 3f or 3g being the stoppers to thereby limit further rotation of the gear 3.

Springs 9 are provided between the rod 7 and the plate 15 and the spring force is applied to the plunger 6 and the rod 7 so that the plunger 6 is normally forced to be at position shown in FIG. 1, un-energized position, therefore, the roller 8 disposed in the shaft portion 7a of the rod 7 is normally forced to tightly engage the guiding edge portion 3b of the arcuate slot 3a as shown in FIG. 3. The base 19 on which various parts such as the motor 1, gear 3, the first and second shafts 4 and 5 and the electromagnetic solenoid S are mounted is secured to the housing base 21 as one body by means of bolts and nuts. A plastic housing cap 22 having a bore 22a through which the power-supply wiring is connected to an external power source, is mounted on to the housing base 21.

In operation, when the motor 1 is energized for a predetermined period of time (150 m sec for instance) so as to rotate the pinion 2 in the counter-clockwise direction (in the direction of an arrow 25 in FIG. 3), and if the electromagnetic solenoid S is not energized as shown in un-energized position of the roller 8 in the arcuate slot 3a of the gear 3, the gear 3 is rotated in the clockwise direction (in the direction of an arrow 26). At this time, the gear 3 is rotated until the roller 8 engages the absorbing member 3f. FIGS. 4(a), 4(b) and 4(c) show three different rotary stop positions of the gear 3.

The above described rotation movement of the gear 3 corresponds to its movement from a position of FIG. 4(b) to a position of FIG. 4(a). In case the gear 3 is rotated from the position of FIG. 4(a) to the position of FIG. 4(b), the reverce rotation of the gear 3, the motor 1 is energized for a certain period of time so as to rotate the pinion 2, this time, in the reverse direction, namely, in the clockwise direction (as shown by an arrow 27) and at this time, if the electromagnetic solenoid S is energized by supplying current to a coil 12, the plunger 6 is attracted toward the stator core 14 and the roller 8 causes interference with the guiding edge portion 3c of the arcuate slot 3a, and the roller 8 is guided along with the guiding edge portion 3c as the gear 3 rotates. Thereafter, when passing halfway the edge portion 3c, the roller 8 is trapped into a recessed portion 3d of the spaced slot 3a and engages the absorbing member 3g corresponding to the third stopper, as a result, the gear 3 can not be further rotated.

In the event the disk 3 is further rotated from the position of FIG. 4(b) to the position of FIG. 4(c), the electromagnetic solenoid S is de-energized when current flowing through the coil 12 stops, thereby the rod 7 returns by the return force of the spring 9 to its un-energized position shown in FIG. 3. In this condition, if, this time, the motor 1 is powered to rotate the pinion 2 in the clockwise direction as shown by the arrow 27, the gear 3 is rotated in the counter-clockwise direction as shown by the arrow 28, thereafter, the roller 8 comes in contact with the absorbing member 3e being the second stopper, as a result, the gear 3 stops at position shown in FIG. 4(c). At this time, the required relative movement is caused by the rotation of the gear 3 between the first shaft 4 and the shaft 24 of a driven source such as a rotary valve.

According to the embodiment described above, rotary position control of six operational patters or modes such as (a)→(b), (b)→(c), (c)→(b), (b)→(a), (a)→(c) and (c)→(a) can be obtained by energizing and de-energizing the coil 12. On the other hand, the two operational modes of (a)→(c) and (c)→(a) are selectively allowed when the electromagnetic solenoid S is de-energized. In addition, the rotary device according to the invention has so excellent moving response that the output shaft 5 of the device or the shaft 24 of the driven source coupled to the output shaft 5 is operated through its full travel, for instance, from position shown by (a) in FIG. 4 to position shown by (c) in FIG. 4 less than 150 m sec.

Figure 5A:
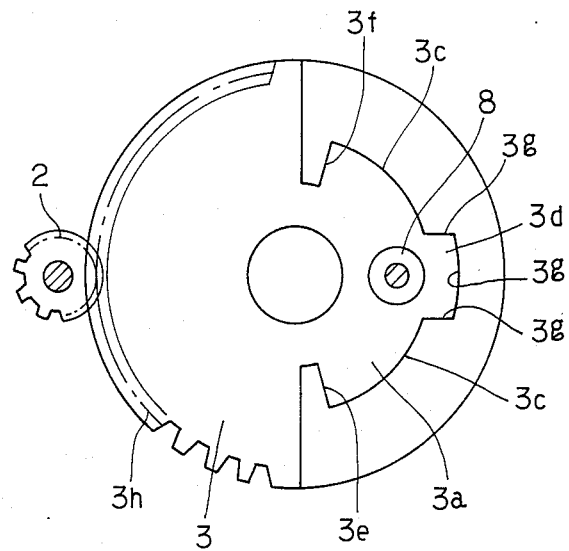
FIG. 5(a) is a cross-sectional view similar to FIG. 3 but showing a second embodiment of the invention.
Figure 5B:
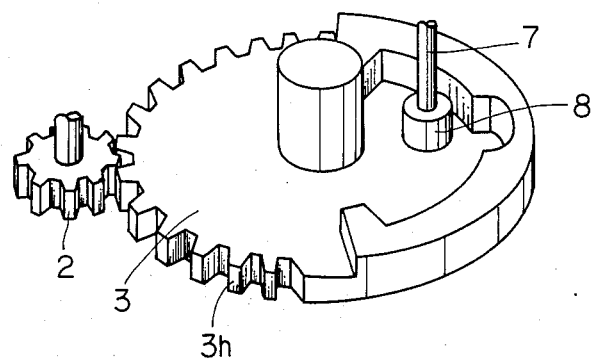
FIG. 5(b) is a perspective view of FIG. 5(a).

FIG. 5(a) and 5(b) show a second embodiment of the gear 3 of FIG. 3 and same numerals have been applied to parts corresponding to the first embodiment. As shown in FIGS. 5(a) and 5(b), a circumferentially spaced semicircular slot 3a may be adopted instead of the arcuate one of the first embodiment.

Furthermore, the roller 8 may be made of synthetic resin or bearing in terms of possible minimum friction between the roller 8 and the guiding edge portion 3c of the arcuate slot 3a.

In addition, the afore-mentioned linkage portion of the second shaft 5 can provide a more positive method of transmitting rotational motion from the rotary device of the invention to the driven load even if there has been discrepancies between the device and the driven source at installation.

The impact force absorbing rubber members 3e, 3f and 3g corresponding to the first to third stoppers of the first embodiment are press-fitted into the arcuate slot 3a of the cast metal gear 3, however, the gear 3 made of metal is modified to a gear made of rubber or elastic synthetic resin which serves itself as an impact force absorbing member, without using the rubber members 3e, 3f and 3g.

According to the invention, it is possible without using an expensive pulse motor to provide a fast response rotary position control device, the output 5 of which is moved with high speeds between three rotary positions and is stopped thereat. Further, according to the invention, additional elements or circuits such as a rotary position detecting sensor and a feed-back mechanism for controlling a motor in accordance with the sensor output are not necessary, thus it is possible to provide a simple, easily assembled and durable rotary position control device at a low cost.

What we claim is:

1. A rotary position control device comprising:
   (1) a motor having an output shaft with a pinion;
   (2) a disk member having a toothed portion on its circumferential part, said disk member being rotated by said toothed portion meshed said pinion;
   (3) a first limit stop provided on said disk member;
   (4) a second limit stop provided on said disk member; and being angularly positioned with respect to said first limit stop;
   (5) a rod member disposed in said first and second limit stops for limiting further rotation of said disk member by engaging said first or second limit stop;
   (6) an electromagnetic solenoid for driving said rod member when energized; and
   (7) a third limit stop provided on said disk member and being positioned between said first and second limit stops for limiting the rotation of said disk member between the first and second stop positions of said disk member by holding said rod member when said electromagnetic solenoid is energized.

2. A rotary position control device as claimed as claim 1, wherein said first, second and third limit stops are formed in one body with said disk member.

3. A rotary position control device as claimed as claim 2, wherein said disk member has a guiding wall provided in association with said first and second limit stops whereby said rod member is guided along the guiding wall by the rotation of said disk member when said electromagnetic solenoid is energized.

4. A rotary position control device as claimed as claim 3, wherein said rod member comprises a rolling member whereby said rolling member contacts and rolls along the guiding wall.

5. A rotary position control device as claimed as claim 3, wherein said third limit stop consists of a recessed portion provided in the area halfway in the guiding wall.

6. A rotary position control device as claimed as claim 5, said device further comprising an elastic member provided at each of said first, second and third limit stop portions whereby further rotation of said disk member is prevented by said elastic members while lessening the impact force thereon.

7. A rotary position control device as claimed as claim 1, wherein said first, second and third limit stops are arranged and positioned such that they are approximately on circumferential line on side opposite to that of said disk member on which said toothed portion is provided.

* * * * *